US008583459B2

(12) United States Patent
Neben et al.

(10) Patent No.: US 8,583,459 B2
(45) Date of Patent: Nov. 12, 2013

(54) SYSTEM AND METHOD FOR IMPLEMENTING PROGRAM COMPLIANCE FOR HEALTH-BASED REWARDS

(75) Inventors: Kathleen Neben, Denver, CO (US);
Julie Skeen, Downers Grove, IL (US);
Scott Johnson, Wheaton, IL (US)

(73) Assignee: TriZetto Corporation, Denver, CO (US)

( * ) Notice: Subject to any disclaimer, the term of this patent is extended or adjusted under 35 U.S.C. 154(b) by 0 days.

(21) Appl. No.: 13/309,880

(22) Filed: Dec. 2, 2011

(65) Prior Publication Data

US 2013/0144655 A1 Jun. 6, 2013

(51) Int. Cl.
*G06Q 40/00* (2012.01)
(52) U.S. Cl.
USPC ............................................................ 705/4
(58) Field of Classification Search
USPC ............................................................ 705/4
See application file for complete search history.

(56) References Cited

U.S. PATENT DOCUMENTS

| | | | | |
|---|---|---|---|---|
| 7,219,071 | B2 | 5/2007 | Gallagher | 705/14.14 |
| 2002/0147641 | A1 | 10/2002 | Hickford et al. | 705/14.25 |
| 2002/0152097 | A1 | 10/2002 | Javors | 705/2 |
| 2002/0178056 | A1 | 11/2002 | Lim | 705/14.2 |
| 2003/0009355 | A1 | 1/2003 | Gupta | 705/2 |
| 2003/0200142 | A1 | 10/2003 | Hicks et al. | 705/14.27 |
| 2005/0228692 | A1 | 10/2005 | Hodgdon | 705/2 |
| 2005/0234742 | A1* | 10/2005 | Hodgdon | 705/2 |
| 2006/0136258 | A1* | 6/2006 | Horn et al. | 705/2 |
| 2006/0178915 | A1 | 8/2006 | Chao | 705/4 |
| 2006/0259362 | A1 | 11/2006 | Cates | 705/14.17 |
| 2008/0033750 | A1 | 2/2008 | Burriss et al. | 705/2 |
| 2008/0071574 | A1 | 3/2008 | Merkin | 705/2 |
| 2009/0216629 | A1 | 8/2009 | James et al. | 705/14.19 |
| 2011/0119075 | A1 | 5/2011 | Dhoble | 705/2 |
| 2011/0313785 | A1* | 12/2011 | Lash | 705/2 |
| 2012/0179489 | A1* | 7/2012 | Gupta | 705/3 |

OTHER PUBLICATIONS

U.S. Appl. No. 12/771,212, filed Apr. 30, 2010, Neben.
U.S. Appl. No. 12/771,185, filed Apr. 30, 2010, Neben.
Information Sheet on Medica Wellness Credits Program, Aug. 28, 2008, http://web.archive.org/web/20080828153148/http://www.mchamn.com/docs/hlwellness.pdf.
Baker, Geoffrey, "Pay for Performance Incentive Programs in Healthcare," Research Report, 2003, http://www.leapfroggroup.org/media/file/Leapfrog-Pay_for_Performance_Briefing.pdf.

(Continued)

*Primary Examiner* — Jessica Lemieux
(74) *Attorney, Agent, or Firm* — Bey & Cotropia PLLC

(57) ABSTRACT

A compliance process provides the ability to identify members that have completed a required activity for a Health Incentive Program (HIP) by comparing standard data such as claims, pharmacy, laboratory, biometric, health risk assessment and other pertinent internal and external data (hereafter "source data") against established compliance criteria for that type of data for the specific HIP. If the member meets all compliance criteria within the designated timeframe, the member's achievement is recorded, resulting in the appropriate reward being granted as defined by the HIP. The compliance process solution provides an automated way for a payer to evaluate internal and/or external data including claims, pharmacy and/or biometric data to identify instances of a member completing required activities.

14 Claims, 4 Drawing Sheets

(56) References Cited

OTHER PUBLICATIONS

PRNewswire, "Medica Uses Hallmark Insights to Drive Participation in My Health Manager Fro Medica," Jul. 21, 2009, http://www.prnewswire.com/news-releases/medica-uses-hallmark-insights-to-drive-participation-in-my-health-manager-from-medicasm-62241252.html.

PDHI Website on ConXus program, Apr. 1, 2009, http://web.archive.org/web/20091213151707/http://www.pdhi.com/products/ConXusProfile.asp.

"Virgin Healthmiles Program Offers Free Loot for Exercising," May 3, 2009, http://www.shrinkgeek.com/2009/05/03/virgin-healthmiles-program-offers-free-loot-for-exercising/.

Hallmark Insights Corporate Business Sheet, Jun. 21, 2006, http://www.hallmarkinsights.com/Documents/Fact_Sheet_final2.doc.

"Kentucky Employee Health Program FAQ on Virgin Healthmiles," Jan. 9, 2009, http://personnel.ky.gov/NR/rdonlyres/B01F8D1B-4C69-4ABE-987C-BA706877C6EE/0/KEHPVirginHealthMiles.pdf.

Virgin Healthmiles Handbook, Apr. 10, 2009, http://personnel.ky.gov/NR/rdonlyres/E4205E69-E9D8-44BA-B99C-D83F0C389DAC/0/VirginHealthMilesHandbookPDF3384KB.pdf.

* cited by examiner

SYSTEM AND METHOD FOR IMPLEMENTING PROGRAM COMPLIANCE FOR HEALTH-BASED REWARDS

BACKGROUND OF THE INVENTION

1. Field of the Invention

The embodiments are generally directed to implementation of health-related compliance programs instituted by payers or related entities.

2. Summary of Existing Art

Payers, e.g., insurance companies and/or employers, recognize the benefit to all health plan participants with the improved health and well-being of individual plan consumers, e.g., employees or self-insured individuals ("members"). Accordingly, in recent years, payers have worked to implement incentive programs which are meant to incentivize individuals to take care of their health. These incentive programs reward individuals for achieving health-related goals. Such rewards include reductions in co-pays, coinsurance and deductibles to gift cards, contribution to health savings accounts and health reimbursement accounts and the like.

Payers typically have to either build custom processes to evaluate claims or other third party data to identify members who are in compliance with incentive program requirements or pay third parties for this service. And these custom built approaches are not integrated with the reward issuance process and the member tracking of actions within incentive programs nor are they integrated with the eligibility or benefits systems.

Accordingly, there is a need for a system and method that integrates incentive program compliance, reward issuance and tracking.

BRIEF SUMMARY

A first process for determining compliance with a health incentive program includes: receiving at a processor member health-related data from at least one data source; applying at least a first filter by the processor to the received member health-related data to identify categories of interest within the member health-related data; providing member health-related data in accordance with the identified categories of interest; receiving an indicator that the member health-related data is available for processing for member compliance with one or more health incentive programs; determining by the processor if one or more health incentive programs applies to the member health-related data in accordance with the categories of interest; applying by the processor compliance rules to the member health-related data for each applicable health incentive program to determine if a member has attained one or more achievement levels; generating by the processor a new achievement record or an update to an existing achievement record for each of the one or more members if the one or more members have attained one or more achievement levels; and making the achievement records available for processing by a reward generation component.

A second process for determining compliance with a health incentive program includes: receiving at a claim processing system medical claims for individuals associated with one or more medical reimbursement products; filtering the medical claims in accordance with at least one of a group, class and medical reimbursement product to which a member is associated; providing data from the medical claims in accordance with an associated medical reimbursement product; receiving an indicator that the data is available for processing for compliance with one or more health incentive programs; determining by a processor if one or more health incentive programs applies to the data in accordance with the associated medical reimbursement product; applying by a conditional processing engine compliance rules for each of the one more health incentive programs to determine if one or more individuals associated with the data has attained one or more achievement levels; if one or more individuals associated with the data has attained one or more achievement levels, confirming by the conditional processing engine, eligibility of the one or more individuals in the one more health incentive programs; generating by the conditional processing engine one of a new achievement record or an update to an existing achievement record for each of the one or more individuals if the one or more individuals have attained one or more achievement levels; and making the achievement records available for processing by a reward generation component.

A third process for determining compliance with a health incentive program includes: receiving at a processor member medical claims data from a first data source; applying at least a first filter by the processor to the received member medical claims data to identify categories of interest within the member medical claims data; providing member medical claims data in accordance with the identified categories of interest; receiving an indicator that the member medical claims data is available for processing for member compliance with one or more health incentive programs; determining by the processor if one or more health incentive programs applies to the member medical claims data in accordance with the categories of interest; applying by the processor compliance rules to the member medical claims data for each applicable health incentive program to determine if a member has attained one or more achievement levels; generating by the processor a new achievement record or an update to an existing achievement record for each of the one or more members if the one or more members have attained one or more achievement levels in accordance with the member medical claims data; receiving by the processor member non-medical claims data from a second source indicating that one or more members have attained one or more achievement levels; generating by the processor a new achievement record or an update to an existing achievement record for each of the one or more members in accordance with the one or more achievement levels attained in accordance with the non-medical claims data; and making the achievement records available for processing by a reward generation component.

BRIEF DESCRIPTION OF THE FIGURES

The following figures are intended to be considered in conjunction with the detailed description provided below and illustrative and exemplary of the preferred embodiments.

DETAILED DESCRIPTION

In accordance with a preferred embodiment, the compliance process provides the ability to identify members that have completed a required activity for a Health Incentive Program (HIP) by comparing standard data such as claims, pharmacy, laboratory, biometric, health risk assessment and other pertinent internal and external data (hereafter "source data") against established compliance criteria for that type of data for the specific HIP. If the member meets all compliance criteria within the designated timeframe, the member's achievement is recorded, resulting in the appropriate reward being granted as defined by the HIP. Exemplary activities or goals and rewards include, but are in no way limited to: rewarding members with a contribution to a health reimbursement account for members obtaining their annual preventative exams; rewarding members who achieve a body mass index (BMI) at or below the target level; and rewarding members with enhanced medical benefits for specific chronic conditions if they complete an education program about their condition. The compliance process solution provides an automated way for a payer to evaluate internal and/or external data including claims, pharmacy and/or biometric data to identify instances of a member completing required activities.

Figure 1:
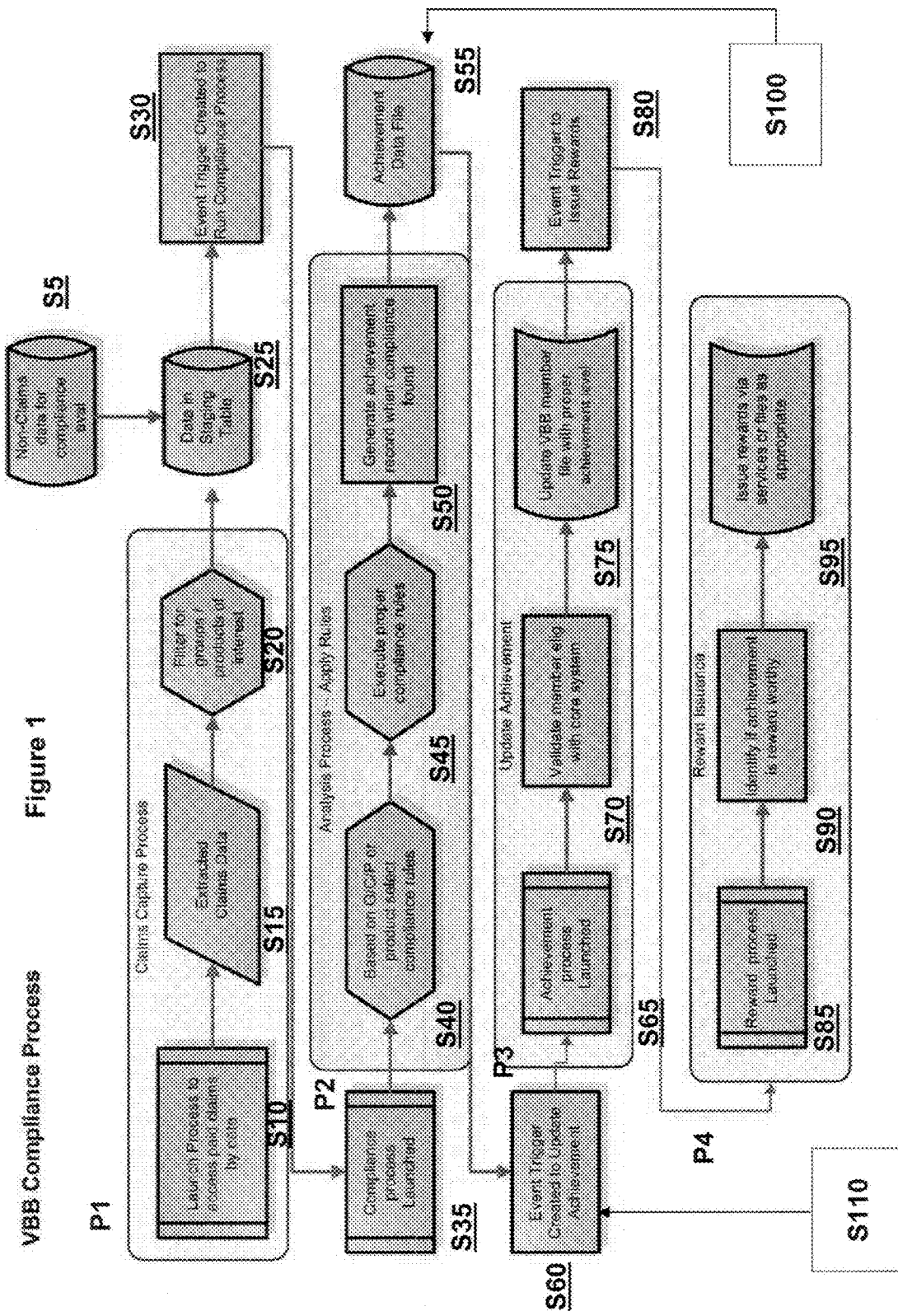
FIG. 1 illustrates a compliance process in accordance with an embodiment described herein.

Referring to FIG. 1, in a first embodiment, an integrated and automated compliance process generally includes four primary processes including claims capture process or collection of non-claims data for compliance P1, analysis process P2, update achievement P3 and reward issuance P4. More specifically, P1 includes: launching a claims access process in accordance with claims date or the process to load non-claims data like biometric data into the staging tables for evaluation purposes S10; extracting data from the claims S15 and applying filters to the extracted data in order to identify groups, classes, plans and/or products of interest as they relate to a specific HIP S20. Transitional steps in the overall process may include population of one or more staging tables with the filtered data S25, including received non-claims data S5; an event trigger is created to run the actual compliance program against the filtered and staged data S30 and launch of the compliance program in response to the trigger S35.

The analysis process P2 includes: selection of applicable compliance rules in accordance with a selected group, class or plan or a selected product S40; application of the rules to the extracted and filtered data in the staging tables S45 and generation of an achievement record when compliance is determined S50. Additional transitional steps may include storage of the generated achievement record in a file/database S55 and creation of an event trigger to run the rewards portion of the process S60. Aspects of the compliance process, e.g., the analysis process P2, could be run at set intervals by the payer, e.g., daily, weekly, etc. or based on number of claims through the payer's core processing system, e.g., every 100,000 claims.

Next, the update achievement process P3, is launched as a result of the trigger that is created when a compliance file is present. This step includes the validation of a member's eligibility S70 against the payers core eligibility system to assure they are still benefit eligible, and hence eligible for participation in the HIP and its associated rewards, the review of the achievement levels (there may be one or many levels) that the member has achieved and the updating of the member's record in the VBB system to identify they have achieved a level of the HIP component and log the information about the compliance (such as dates etc.) S75. Finally, the rewards issuance process P4 includes: launch of the rewards process after the updating of the member achievement. In response to the event trigger S80. This includes the logic to evaluate the achievement level to determine if it is reward worthy S90 and the finally rewards are issued S95.

Figure 2:
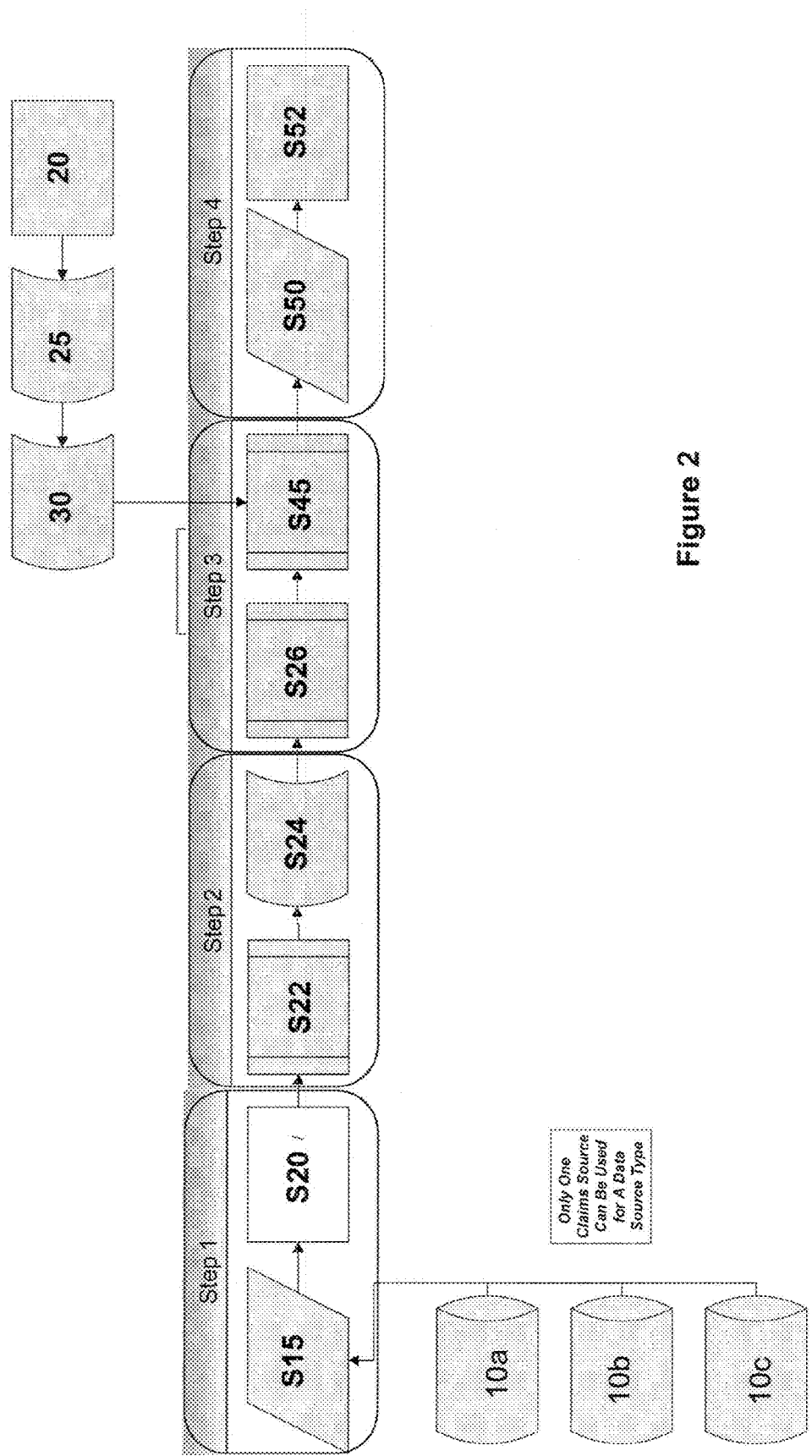
FIG. 2 illustrates a compliance process in accordance with an embodiment described herein.

Referring to FIG. 2, the claims capture and analysis processes P1, P2 of FIG. 1 may include more particularly Step 1 which includes receipt of claims data S15 from an existing claims data database, e.g., 10a, 10b, 10c. The databases 10a, 10b, 10c may be part of existing commercial claims processing systems, e.g., FACETs, QNXT, or custom claims processing systems utilized by individual payers. The claims processing systems are also referred to as core administration systems and may be resident at payer or payer controlled location. Alternatively portions of the core administration processes may be handled by a third-party system under contract with the payer. In accordance with Step 1 claims data from the core administration system is published on a scheduled basis into a "harmonized" schema into the staging table and then used for compliance evaluation. This claims capture process may be automated where the communicating systems have pre-established communications architecture or various implementation services may be used to create logic to populate claims data into the staging tables. This schedule of claims data may be utilized by other processes in addition to the compliance processes described herein. As part of this staging publication, a single timestamp value may be updated to each record per run so that all records from the same run have a matching timestamp. This will allow archiving or deletion of the data at a later time.

Further to Step 1, the received data is filtered based on groups, classes, plans and/or products of interest to assure only desired data are retained. S20. Examples of this process include extracting data only for selected employer groups and any appropriate further classification if employees such as Joe's trucking, salaried employees (versus hourly), in plan PPO A (versus those in PPO B). This filtering may also done for particular fully insured product populations (e.g. everyone who purchases PPO C). Further filtering in Step 2 may be accomplished using published HIP Association List data against the staged claims data to identify groups, classes and/or plans that are of interest to the HIP for claims compliance as well as accounting for classes/plans that are excluded within a specific HIP in order to provide a reduced set of relevant claims S22. This additional filtering step operates to identify links between claims and applicable. HIP rule sets and the resulting, twice filtered claims are put in an event processor queue S24.

In Step 3, the filtered records are evaluated to determine which are to be reviewed S26 and the claims in the filtered records are next evaluated based on specific HIP criteria/rules. Claims in the staging tables are evaluated by the CPE to identify if the claim meets any of the appropriate HIP criteria/rules. First step in the processing is the determination of which rules to apply to the claim which is based on the group/class/plan association of the member for whom the claim was submitted. For example, Sally works for Joe's Trucking (group), is an hourly employee (class), in PPO A (plan). That determines the rules that are applied to her claims by the CPE. The CPE evaluates the claim or event for the specific compliance rule sets (claims-related criteria) for relevant HIPs. Each member may be eligible for multiple HIP components so multiple rules are potentially applied to each claim row. Each row of the claim is reviewed because a single claim could reflect multiple events. Accordingly, a single claim and each event identified therein may be evaluated in accordance with each HIP available for the claim member first in accordance with time of service (and dropped if outside the time of service requirement) and next in accordance with the individual rules for each HIP as determined by the CPE.

In Step 4, the achievement records are generated when the results of the evaluation in S45 indicate that a member has achieved an articulated goal S50 and follow-up processing, e.g., member file updates, reward generation, and the like is completed S52. The specific HIP criteria/rules for the evaluation in S45 may be configured by the payer using a related value-based benefits application, e.g., web application, 20, to enter VBB compliance configuration data 25 and associated compliance rules 30 into the CPE.

In a specific example, Member A receives a reward for receiving an A1C test twice a year. The reward component could be set up as a single achievement level, i.e., Member A must have both tests within a year window in order to receive a reward, or as two achievement levels—one for each test. In either case, the compliance criteria would be defined as, for example, Claims Based (as compared to lab, biometric or other-based), DX code (Diagnosis Code) of 250.00-259.09, and Procedure code of 83036. When a claim is received and processed through the process routine meeting the defined compliance criteria and achievement level of FIG. 2, Member A would be marked as achieved and the applicable reward issued.

Figure 3:
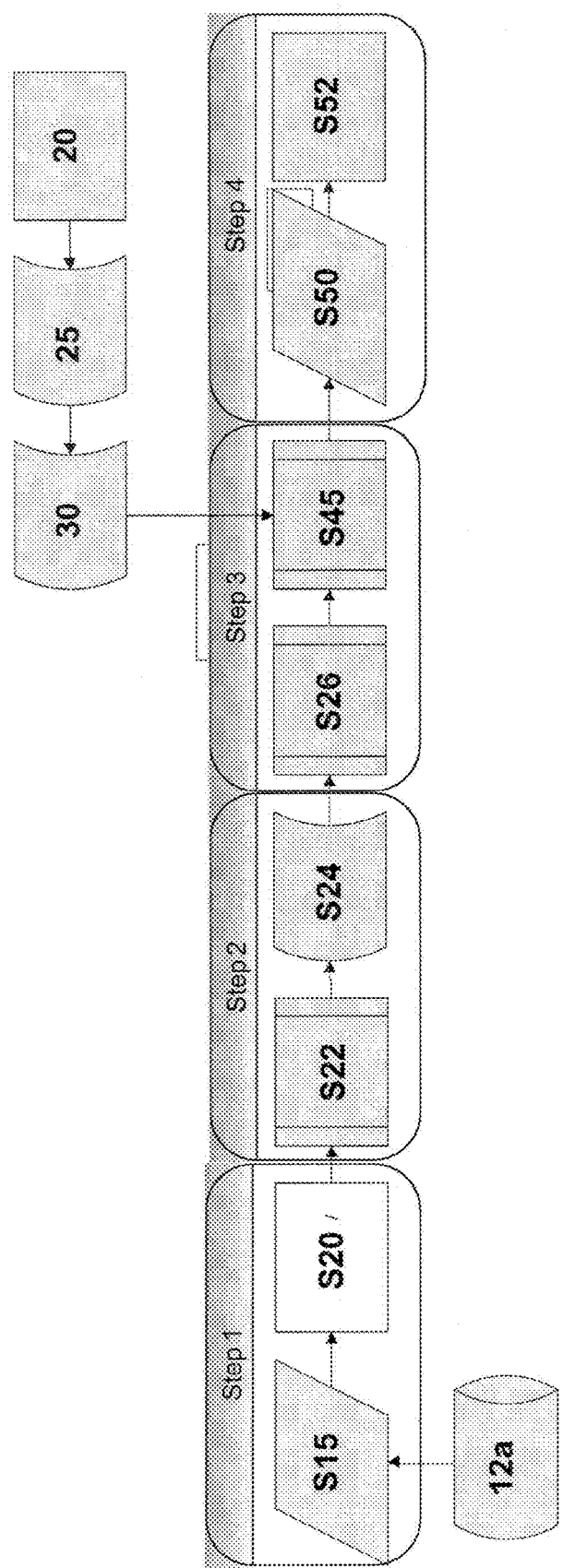
FIG. 3 illustrates a compliance process in accordance with an embodiment described herein.

Referring to FIG. 3, the components and processes are generally similar, with the exception being that the input data is biometric data 12a as compared to claims data. Biometric data is loaded into the staging tables for the analysis process in Step 1 just as the claims data was received in FIG. 2. A specific example of a biometric file based compliance process is to reward a member for receiving a biometric screening which includes a cholesterol test if the cholesterol level is in the healthy target range. A component for a biometric screening would be set up with an achievement level for a healthy cholesterol value. A further variation on this could include a multi-level achievement wherein a first reward is given for completing the biometric screening in the first instance—without regard for results—with additional rewards given for actual positive results. For the cholesterol achievement reward, the compliance criteria could be defined as Biometric Based (as compared to claims, lab, or other-based), with a total Cholesterol value of <=200 Mg/Dl. When a biometric file is received and processed through the process routine of FIG. 3, and if the member is in the healthy target range they would be marked as achieved and the applicable reward issued. Biometric files could be forwarded from an employer, e.g., as a result of an employer screening campaign conducted at a worksite. Alternatively some payers conduct worksite wellness fairs either themselves or in conjunction with wellness firms with whom they contract.

While FIGS. 2 and 3 above refer to specific types of source data, e.g., claims and biometric, the embodiments are not so limited. Various types of non-claims source data, including claims, pharmacy, laboratory, biometric, health risk assessment and other pertinent internal and external data may be reviewed and processed against HIPs in accordance with the invention described herein (See FIG. 1, S5, S100, S110). Further, this data may come from providers, members, payers, employers and other third party source data collectors, e.g., vendors such as MEDai, smoking cessation programs, weight management vendors and the like. For example, a reward may result from Member A enrolling in and completing a disease or wellness education program. The present invention incorporates a member web-based access application that enables the user to log-in and link to approved on-line disease or wellness education programs to view educational material and take education courses. The wellness program will recognize Member A and will record the results of their visit and report back to the status of the course (started, in process, or completed). This will enable Member A to clearly view their status in the program from the web-application. And, when Member A completes an education program or decision point, the trusted wellness program will communicate this to complete to the core processing system (or other designated source data collector). For trusted programs, the achievement file S100 may be input into the process at S55 as shown in FIG. 1. Similarly, members may enter achievement records, i.e., self report completion of a required activity S110 into the process at S60 as shown in FIG. 1. Importantly, for third party vendors, Member personal health information is not accessible as all member activity is anonymized through unique identifiers.

As discussed above, the CPE applies numerous filters or qualifiers to source data in order to process the data for achievements under the HIPs. In order to apply specific rules of the HIP, data qualifiers are applied such as, but not limited to, Member Age, Member Gender, and Member status as Subscriber or Relationship to a Subscriber. Additionally, date qualifiers may include, but are not limited to: Claim Service From Date Calendar Month, Claim Service From Date Calendar Quarter; Claim Service From Date Calendar Semester; Claim Service From Date Plan Month; Claim Service From Date Plan Quarter; Claim Service From Date Plan Semester; Claim Service To Date Calendar Month; Claim Service To Date Calendar Quarter; Claim Service To Date Calendar Semester; Claim Service To Date Plan Month; Claim Service To Date Plan Quarter; Claim Service To Date Plan Semester. Since there could be multiple claim service lines for a single claim being evaluated for compliance and the Claim Service Date exists on each claim service line, the earliest ServiceFromDate and the latest ServiceToDate for all claim service lines will be used for this evaluation.

As exemplified and discussed above with respect to the multiple achievement levels, the Service Date may be used to further designate which achievement level to allocate the compliance to based on some division of the year. The year may be based on calendar year or the member's plan year. The qualifiers facilitate evaluation of Service Date based on Calendar Month, Calendar Quarter, Calendar Semi-Year ($1^{st}$ half or $2^{nd}$ half) or Plan Month, Plan Quarter, or Plan Semi-Year. The Plan Year calculations are based on the member's plan year. Month would allow values of January thru December (each month of the year). Quarter would allow values of $1^{st}$ Quarter, $2^{nd}$ Quarter, $3^{rd}$ Quarter, and 4th Quarter. Semi-Year would allow values of First Semester, Second Semester. Further, for Plan-based date qualifiers (as compared to claim based date qualifiers), in order to determine the date qualifiers for a plan-based date, the HIP coverage type is first determined. Then, the coverage type is used to obtain the Plan Dates for that coverage type from the Member Coverage data. Additional claim-based qualifiers may be used to identify if a service billed on the claim is the required services these include, but are not limited to: DRG Codes; ICD codes (Procedure, Diagnosis) and Bill codes; In/Out Network; Preferred Care Provider ("PCP") or not; Provider Specialty; Provider Type; Cobra; Patient Centered Medical Home ("PCMH") Indicator; Payment Bundle indicator and Center of Excellence Indicator.

The types of rewards that may be offered can vary and may include but are not limited to: cash, points towards various catalogued rewards or gift cards, gift cards, contributions to a health savings account, contributions to a health reimbursement account, and modifications in benefits for medical and/or prescription drug coverage and the like. In a particular reward implementation a reduction in co-pay or co-insurance could be automatically applied as a reward. For example, medical plan A has a deductible and offers 40% co-insurance for most services. In accordance with an HIP tied to medical plan A, rewards for various achievements or achievement levels could be that a member's co-insurance drops to 5%, 10% or 0% for specified services In this case, the reward would be an override of medical plan A's 40% co-insurance for the identified services. Additionally, there are instances where a single achievement could actually trigger multiple rewards. For example, a substantial weight loss could trigger reduced BMI, reduction in diabetes risk, compliance with weight loss program, etc. While the compliance program could give multiple rewards, there could also be a situation where the member must select a single reward or less than all the rewards. There could also be an implementation wherein the compliance program selects the reward based on predetermined rules.

Figure 4:
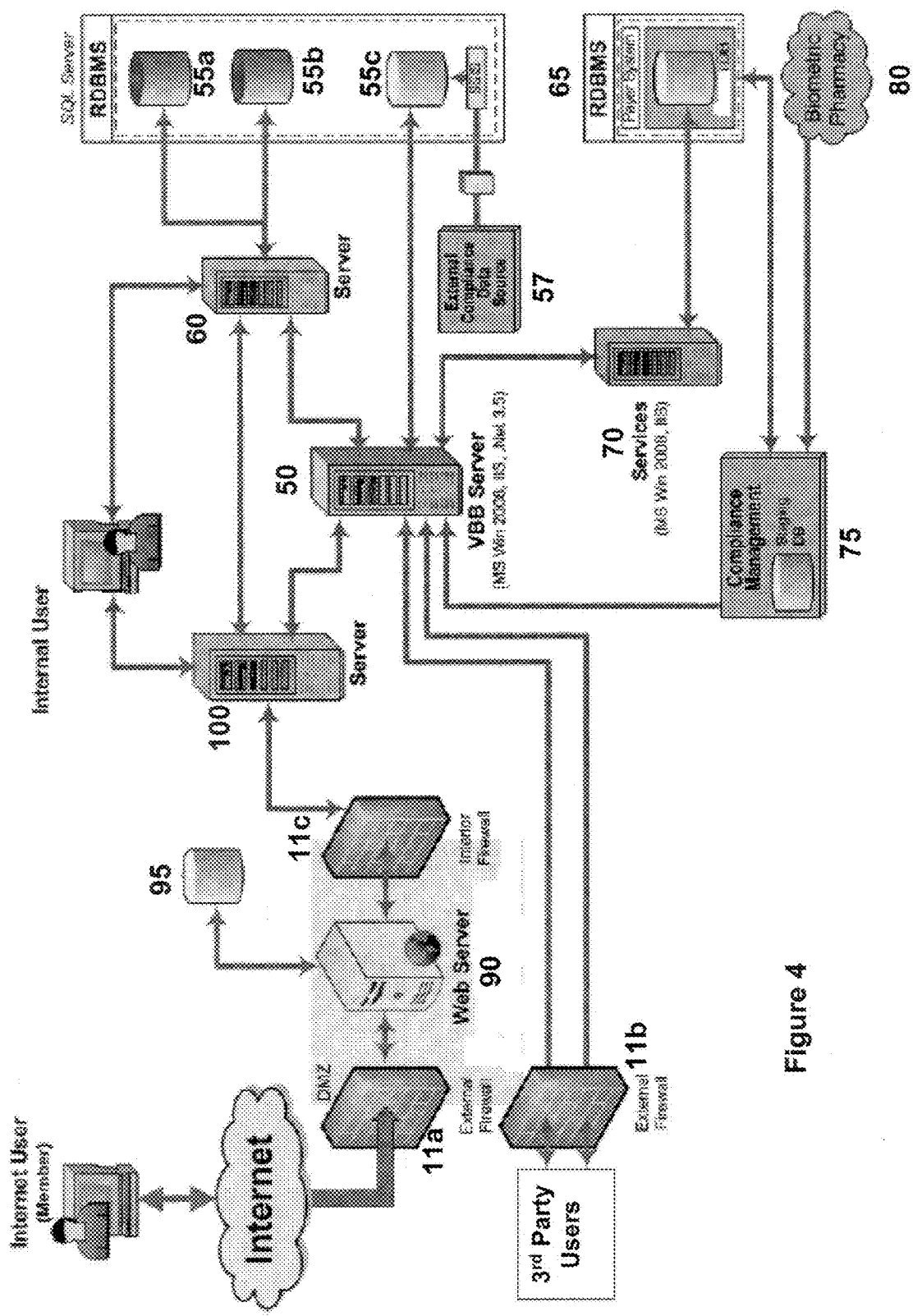
FIG. 4 illustrates an exemplary system for implementing the compliance processes in accordance with the embodiment described herein.

Referring to FIG. 4, an exemplary system for implementing the processes described herein is illustrated. This particular system includes at lease one core server 50 in communication with one or more databases 55a-55c for accessing and storing data that is relevant to one or more phases of the compliance process phases described herein. As illustrated, these databases may be configured to store external compliance data from an external source 57. The data to from core server 50 and databases 55a-55c passes through a communications server 60. With respect to claims data collection, the core server 50 can be part of a larger system wherein claims data is received in an automated process from in-system claims servers, e.g., TriZetto compliance servers are integrated in an automated fashion with TriZetto's FACETS and QNXT claims processing servers. Similarly, the core server 50 may also receive claims data from non-system claims processing servers. Both in-system and non-system claims data databases are represented in FIG. 4 as database 65. For in-system claims data, other services in addition to compliance, e.g., claims processing, benefits managements and the like can be accomplished through in-system server 70. Other services are described in, for example, commonly owned U.S. patent application Ser. Nos. 12/771,212 and 12/771,185 both entitled "SYSTEMS AND METHODS FOR MANAGING BENEFITS IN A HEALTH PLAN" filed Apr. 30, 2010, which are incorporated herein by reference in their entirety. For non-system claims data, this would not pass through the in-system server 70, but instead populates the compliance management staging tables in the staging database 75. Similarly, other non-claims data such as biometric and pharmacy data 80 is also directed to the staging tables in the staging database 75. The data from all databases 55a-55c, 65 and 75 is run through one or more phases of the compliance process using applications running on the core server 50.

Further to FIG. 4, access to core server 50 by various users is managed through a series of external 11a, 11b and internal 11c firewalls. For member users accessing through the internet, web server 90 performs an identity check by communicating with the member's identity provider 95. Once through the firewalls, member access is managed by internal security server 100 which also manages internal users such as administrators of the compliance processes and architecture. Finally, 3rd party users such as those from health screening and reward companies may have access to core server 50 as well. One skilled in the art recognizes that the components for implementing functionality described herein may be housed in various locations and/or managed by third parties on behalf of users, e.g., payers, as part of a service.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed without departing from the scope and spirit of the disclosure. Accordingly, such alternative embodiments are included in the disclosures described herein.

The exemplary embodiments can be used with computer hardware and software that perform the methods and processing functions described above. Exemplary computer hardware include smart phones, tablet computers, notebooks, notepad devices, personal computers, personal digital assistances, and any computing device with a processor and memory area. As will be appreciated by those having ordinary skill in that art, the systems, methods, and procedures described herein can be embodied in a programmable computer, computer executable software, or digital circuitry. The software can be stored on computer readable media. For example, computer-coded, software, scripts, computer-readable software code, and programs are software codes used interchangeably for the purposes of simplicity in this disclosure. Further, memory, computer-program product and storage can include such media as floppy disk, RAM, ROM, hard disk, removable media, flash memory, memory stick, optical media, magneto-optical media, CD-ROM, etc.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An automated process for determining compliance with a health incentive program comprising:
   receiving at a server member health-related data from at least one data source, wherein the member health-related data includes health-related data for multiple individual members;
   applying at least a first filter by the server to the received member health-related data to identify categories of interest within the member health-related data and extracting a subset of the member health-related data for each of the individual members in accordance with the identified categories of interest;
   receiving an indicator that the subset of member health-related data is available for processing for individual member compliance with one or more health incentive programs;
   determining by the server if the one or more health incentive programs applies to each individual member based on the subset of member health-related data in accordance with the categories of interest;
   applying by the server compliance rules to the subset of member health-related data for each applicable health incentive program to determine if the individual member has attained one or more achievement levels;
   validating by the server member eligibility to participate in the applicable health incentive program for each individual member who has attained one or more achievement levels;
   generating by the server a new achievement record or an update to an existing achievement record for each of the one or more individual members if the one or more individual members has attained the one or more achievement levels; and making the achievement records available for processing by a reward generation component running on the server.

2. The process according to claim 1, wherein the at least one data source is a data source for medical claims and the member health-related data comprises medical claims data received at a medical claims processing component.

3. The process according to claim 2, further comprising applying at least a second filter to the medical claims data to determine claim date information prior to determining if one or more health incentive programs applies; wherein the claim date information is utilized to determine at least one of if one or more health incentive programs applies and if one or more members associated with the member health-related data has attained one or more achievement levels.

4. The process according to claim 1, wherein the at least one data source is a data source for non-medical claims data and includes at least one of biometric data, pharmacy data, laboratory data, and health assessment data.

5. The process according to claim 1, wherein there are at least two data sources, a first data source for providing medical claims data and a second data source for providing non-medical claims data.

6. The process according to claim 5, wherein the non-medical claims data is received at the server after applying by the server compliance rules to the subset of member health-related data for each applicable health incentive program to determine if an individual member has attained one or more achievement levels.

7. The process according to claim 2, wherein server compliance rules are applied to each row of received medical claims data to determine if multiple achievement levels have been attained by a member.

8. The process according to claim 4, wherein server compliance rules are applied to each row of received non-medical claims data to determine if multiple achievement levels have been attained by a member.

9. The process according to claim 1, further comprising determining by the reward generation component, the one or more individual member's reward and applying the reward to the member.

10. The process according to claim 9, wherein applying the reward to the member includes automatically reducing an amount owed by the member under the member's medical plan.

11. The process according to claim 10, wherein the automatic reduction is selected from a reduction in co-insurance and a reduction in co-payment.

12. The process according to claim 1, wherein the one or more achievement levels are associated with at least one of: a member attaining a biometric goal; a member completing a health assessment; a member obtaining a medical test; a member completing a health-related educational course; a member completing a course of medical treatment; and a member completing self reporting of medical status requirements.

13. The process according to claim 1, further comprising determining by the server the eligibility of the one or more members in the one more health incentive programs prior to generating one of a new achievement record or updating an existing achievement record for the one or more members.

14. The process according to claim 1, wherein extracting a subset of member health-related data in accordance with the identified categories of interest includes populating by the server a staging table with the subset of member health-related data in accordance with the identified categories of interest.

* * * * *